(12) United States Patent
Sabripour et al.

(10) Patent No.: US 11,348,386 B2
(45) Date of Patent: May 31, 2022

(54) SYSTEM AND METHOD FOR AUTHENTICATION QUEUING IN ACCESS CONTROL SYSTEMS

(71) Applicant: MOTOROLA SOLUTIONS, INC., Chicago, IL (US)

(72) Inventors: Shervin Sabripour, Plantation, FL (US); John B Preston, Plantation, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 6 days.

(21) Appl. No.: 16/869,179

(22) Filed: May 7, 2020

(65) Prior Publication Data

US 2021/0350639 A1 Nov. 11, 2021

(51) Int. Cl.
*G06F 21/34* (2013.01)
*G06F 21/32* (2013.01)
*H04W 12/06* (2021.01)
*G07C 9/00* (2020.01)

(52) U.S. Cl.
CPC ......... *G07C 9/00309* (2013.01); *G06F 21/32* (2013.01); *G06F 21/34* (2013.01); *H04W 12/06* (2013.01)

(58) Field of Classification Search
None
See application file for complete search history.

(56) References Cited

U.S. PATENT DOCUMENTS

| 9,984,520 | B1* | 5/2018 | Heller | G07C 9/38 |
| 10,169,937 | B1 | 1/2019 | Zwink et al. | |
| 2015/0221151 | A1* | 8/2015 | Bacco | H04L 63/107 |
| | | | | 340/5.83 |
| 2019/0172281 | A1 | 6/2019 | Einberg et al. | |
| 2020/0036708 | A1 | 1/2020 | Mars et al. | |
| 2020/0214070 | A1* | 7/2020 | Ingale | H04W 74/0833 |

FOREIGN PATENT DOCUMENTS

| KR | 101632944 B1 | 7/2016 |
| WO | 2018222294 A1 | 12/2018 |

OTHER PUBLICATIONS

The International Search Report and the Written Opinion corresponding patent application No. PCT/US2021/029095 filed: 26b Apr. 2021, dated Jul. 23, 2021, all pages.

* cited by examiner

*Primary Examiner* — John F Mortell (57) ABSTRACT

A method for authentication queuing in access control systems is provided. The method may include establishing, by an access control system, a first wireless connection with a mobile device. The method further includes authenticating the mobile device over the first wireless connection. The method also includes adding the mobile device to a first authenticated devices queue associated with a first physical access point. The method includes sending a reconnection parameter to the mobile device. The method additionally includes disconnecting the first wireless connection to the mobile device.

20 Claims, 8 Drawing Sheets

SYSTEM AND METHOD FOR AUTHENTICATION QUEUING IN ACCESS CONTROL SYSTEMS

BACKGROUND

Access control systems may be utilized to prevent access to restricted areas by people who are not authorized to be in those restricted areas. For example, a simple example of an access control system may be a door with an electronic lock coupled to a radio frequency identification (RFID) badge reader. The door may be considered a physical access point. A person who wishes to pass through the physical access point may present a RFID token (e.g. ID badge, etc.) which provides information about the person to whom the RFID token was issued. The access control system may check a database to ensure that the person assigned to the token is authorized to pass through the door. If so, the door may unlock and the person may pass through the physical access point. If the person is not authorized, the door remains locked, thus ensuring that unauthorized people do not gain access to restricted areas.

The process of presenting an RFID token to a reader requires active participation on the part of the user attempting access. Because RFID tokens are typically read within a range of inches, the user will typically have to physically hold the token within close proximity of the reader. To alleviate this issue, some access control systems include tokens whose readers utilize wireless connection technology that operates at longer range and may not require active participation by the user. One example of such technology is Blue Tooth Low Energy (BLE) that may be included on any number of mobile devices (e.g. smartphone, smartwatch, fitness monitor, fob, etc.). As the user approaches the physical access point, a connection may be established between the user's mobile device and the reader. The mobile device may be authenticated, and if the user associated with the device is authorized to enter the restricted area, the door may unlock. It should be understood that given the longer range of the wireless connection technology, the user need not remove his mobile device (e.g. it may remain in a pocket, on the wrist, etc.) thus allowing a more seamless traversal of the physical access point.

In some access control systems, the token (e.g. RFID, BLE, etc.) may be a first factor in a two factor authentication scheme. For example, a second factor may be facial recognition. The user's token may be associated with a face. When the user attempts to access the physical access point, the mobile is authenticated as described above. However, to avoid the case where a user's mobile device is being improperly used (e.g. stolen smartphone, lost smartwatch, etc.) possession of the mobile device is not sufficient to grant access. Instead, a facial recognition system is utilized to verify that the mobile device is in the possession of a person whose face matches that which has previously been associated with the mobile device. Thus, the access control system does not grant access without the presence of the two factors: 1) Facial Recognition and 2) possession of the mobile device.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Use of longer range wireless technologies, such as BLE, in access control systems provides the advantage that the user need not actively engage in any activity in order to utilize an access control system. The user simply moves into the area of the physical access point, a reader establishes a connection with the user's mobile device and authenticates the mobile device, it is determined if the user is authorized to traverse the physical access point, and if so, the user is allowed to enter. No specific steps on the part of the user are required.

A problem arises when there are multiple users within the vicinity of a physical access point. Typical BLE readers are limited in the number of BLE connections that can be maintained at any given time. For example, low cost BLE modules may only be able to maintain 2-4 simultaneous connections. Consider the case of an access control system that controls access to a conference room whose BLE module supports four simultaneous connections. Assume that the conference room is across the hall from an employee break room and that all employees use a mobile device (e.g. smartphone) for use with the access control system.

For purposes of this example, assume that there are four employees in the break room, and because those employees are within range of the conference room BLE reader, the employees' devices will make and maintain a connection to the BLE reader. These four employees may have no intention of entering the conference room at all, however they have fully occupied all four available BLE connections. Now assume a fifth employee arrives and desires to enter the conference room. Because no more connections are available, the fifth employee is not able to connect to the BLE reader, and as such his mobile device cannot be authenticated. Because the mobile device cannot be authenticated, the fifth employee cannot be granted access to the conference room.

Although high end BLE modules are available that support up to 20 simultaneous connections, the cost of such modules is typically much greater than the lower end modules. The high cost makes use of those modules in access control systems cost prohibitive, considering that in some applications every single door in a building may need to have access control. Furthermore, even a higher number of available connections still may not solve the problem.

For example, consider the elevator lobby of a high-rise building. A physical access point may be positioned to limit access to the elevator banks to authorized users only. During a busy period (e.g. morning when employees are arriving at work) there may be dozens of authorized people attempting to gain entry. Given the nature of wireless communications, it is possible that all available connections are used by people at the back of the pack of people entering the building, thus preventing those at the front from entering the elevator lobby. If those at the front are not able to enter, those in the back will be stuck behind them, creating a deadlock condition, preventing anyone from accessing the elevators.

The techniques described herein solve these problems individually and collectively. Initially, when a mobile device comes into range of a wireless reader, such as a BLE reader, associated with a physical access, the mobile device will establish a connection and will engage in an authentication procedure with the access control system. If the mobile device is successfully authenticated, the mobile device will be placed in an authenticated devices queue. The mobile device will be given a parameter, such as an amount of elapsed time, which will inform the mobile device as to when to attempt reconnect in order to re-authenticate.

The mobile device will then disconnect from the wireless reader, thus freeing up the connection for use by another user. Because the mobile device has been instructed not to reconnect until such criteria as specified by the parameter have been met, the mobile device will not attempt to reconnect immediately. When the user of the mobile device approaches the physical access point and provides a second authentication factor (e.g. facial recognition, voice print, key code entry, etc.) the access control system will recognize the user and determine if the mobile device associated with the user is included in the authenticated devices queue. If so, there is no need to authenticate the user's mobile device.

Further advantages and features consistent with this disclosure will be set forth in the following detailed description, with reference to the figures.

A method is provided. The method includes establishing, by an access control system, a first wireless connection with a mobile device. The method also includes authenticating the mobile device over the first wireless connection. The method further includes adding the mobile device to a first authenticated devices queue associated with a first physical access point. The method additionally includes sending a reconnection parameter to the mobile device. The method also includes disconnecting the first wireless connection to the mobile device.

In one aspect, the method further includes establishing, by the access control system, a second wireless connection with the mobile device, authenticating the mobile device over the second wireless connection, adding the mobile device to a second authenticated devices queue associated with a second physical access point, determining that the mobile device is approaching the first physical access point, disconnecting the second wireless connection to the mobile device, and deleting the mobile device from the second authenticated devices queue.

In one aspect, the method includes recognizing a face of a user via a facial recognition system associated with the first physical access point and determining, based on the recognized face, if the user is associated with any mobile device in the first authenticated devices queue prior to disconnecting the first wireless connection to the mobile device. In one aspect the method includes determining that a user of the mobile device has an intent to enter the first physical access point prior to disconnecting the first wireless connection to the mobile device.

In one aspect, the method includes determining that a user of the mobile device has entered the first physical access point prior to disconnecting the first wireless connection to the mobile device. In one aspect, the method includes deleting the mobile device from the first authenticated devices queue when the mobile device does not reconnect the wireless connection in accordance with the reconnection parameter. In one aspect, the first wireless connection is a Bluetooth Low Energy (BLE) wireless connection. In one aspect, the reconnection parameter comprises a time. In one aspect, the mobile device is a smartphone.

A system is provided. The system includes a processor and a memory coupled to the processor. the memory containing a set of instructions thereon that when executed by the processor cause the processor to establish, by an access control system, a first wireless connection with a mobile device. The instructions further cause the processor to authenticate the mobile device over the first wireless connection. The instructions further cause the processor to add the mobile device to a first authenticated devices queue associated with a first physical access point. The instructions further cause the processor to send a reconnection parameter to the mobile device. The instructions further cause the processor to disconnect the first wireless connection to the mobile device.

In one aspect the instructions further cause the processor to establish, by the access control system, a second wireless connection with the mobile device, authenticate the mobile device over the second wireless connection, add the mobile device to a second authenticated devices queue associated with a second physical access point, determine that the mobile device is approaching the first physical access point, disconnect the second wireless connection to the mobile device, and delete the mobile device from the second authenticated devices queue.

In one aspect, the instructions further cause the processor to recognize a face of a user via a facial recognition system associated with the first physical access point and determine, based on the recognized face, if the user is associated with any mobile device in the first authenticated devices queue prior to disconnecting the first wireless connection to the mobile device. In one aspect, the instructions further cause the processor to determine that a user of the mobile device has an intent to enter the first physical access point prior to disconnecting the first wireless connection to the mobile device.

In one aspect, the instructions further cause the processor to determine that a user of the mobile device has entered the first physical access point prior to disconnecting the first wireless connection to the mobile device. In one aspect, the instructions further cause the processor to delete the mobile device from the first authenticated devices queue when the mobile device does not reconnect the wireless connection in accordance with the reconnection parameter.

A non-transitory processor readable medium containing a set of instructions thereon is provided. The instructions, when executed by a processor, cause the processor to establish, by an access control system, a first wireless connection with a mobile device. The instructions further cause the processor to authenticate the mobile device over the first wireless connection. The instructions further cause the processor to add the mobile device to a first authenticated devices queue associated with a first physical access point. The instructions further cause the processor to send a reconnection parameter to the mobile device. The instructions further cause the processor to disconnect the first wireless connection to the mobile device.

In one aspect the instructions on the medium further cause the processor to establish, by the access control system, a second wireless connection with the mobile device, authenticate the mobile device over the second wireless connection, add the mobile device to a second authenticated devices queue associated with a second physical access point, determine that the mobile device is approaching the first physical access point, disconnect the second wireless connection to the mobile device, and delete the mobile device from the second authenticated devices queue.

In one aspect, the instructions on the medium further cause the processor to recognize a face of a user via a facial recognition system associated with the first physical access point and determine, based on the recognized face, if the user is associated with any mobile device in the first authenticated devices queue prior to disconnecting the first wireless connection to the mobile device. In one aspect, the instructions on the medium further cause the processor to determine that a user of the mobile device has an intent to enter the first physical access point prior to disconnecting the first wireless connection to the mobile device.

In one aspect, the instructions on the medium further cause the processor to determine that a user of the mobile device has entered the first physical access point prior to disconnecting the first wireless connection to the mobile device.

Figure 1:
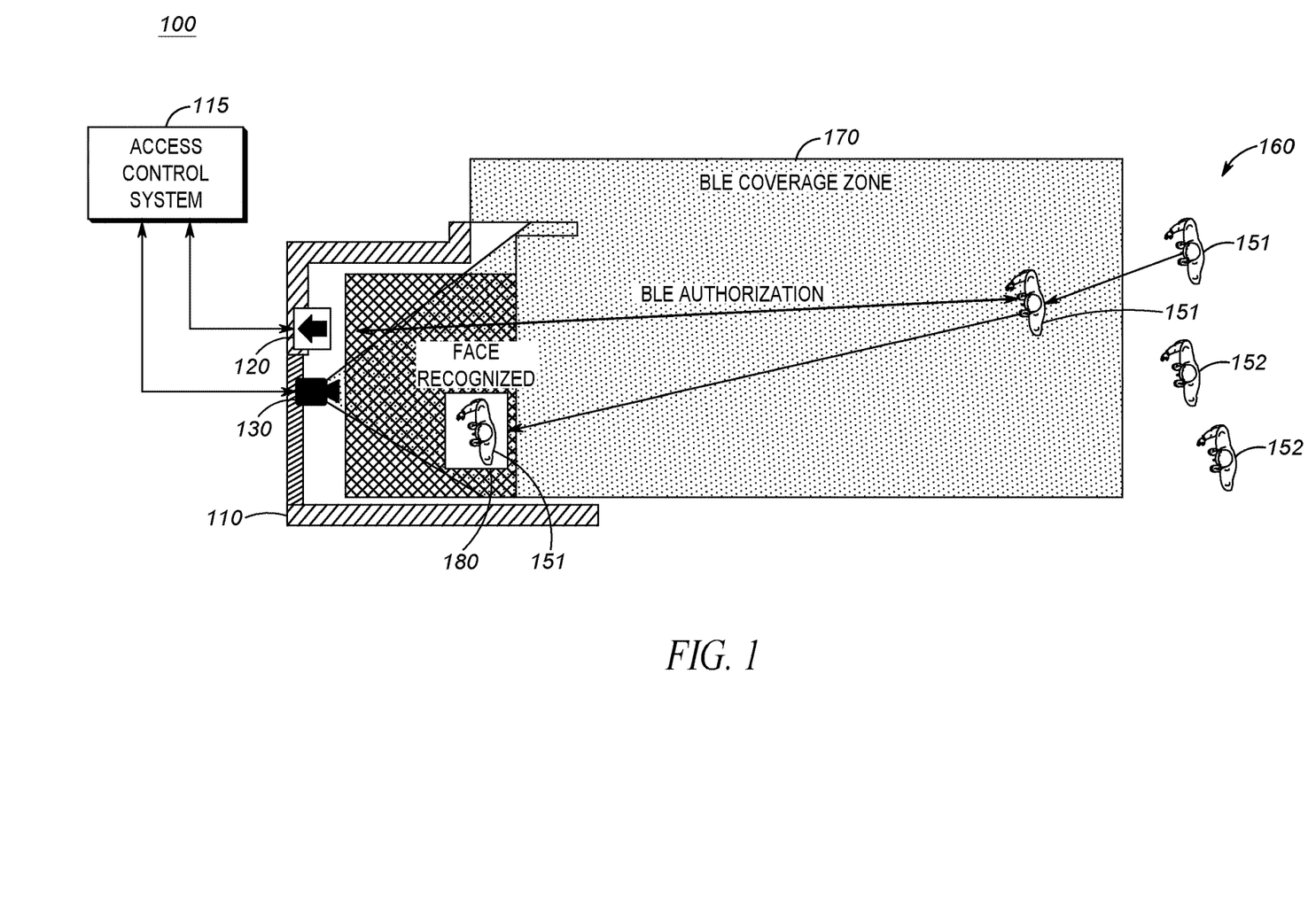
FIG. 1 is an example of an access control system utilizing a possession of an authorized mobile device as a second factor to grant access to a physical access point.

FIG. 1 is an example of an access control system utilizing a possession of an authorized mobile device as a second factor to grant access to a physical access point. System 100 includes a physical access point 110, an access control system 115, a wireless reader 120, and a second factor authentication system 130.

The physical access point 110 may be a device that is used to control access to an area the is restricted to authorized personnel. A simple example of a physical access point 110 is a door that is locked via an electrically controlled lock. Other examples may include electrically actuated turnstiles, gates, sliding doors, mantrap systems, etc. The techniques described herein are not limited to any particular type of physical access point 110. Any physical access point 110 that is capable of allowing/denying access to a restricted area is suitable for use with the techniques described herein. The techniques described herein are further not limited to any particular type of restricted area. Restricted areas may include rooms (e.g. offices, conference rooms, storage areas, etc.), building areas (e.g. elevator lobbies, maintenance areas, loading docks, etc.), and any other area that may have access limited to authorized personnel.

Figure 8:
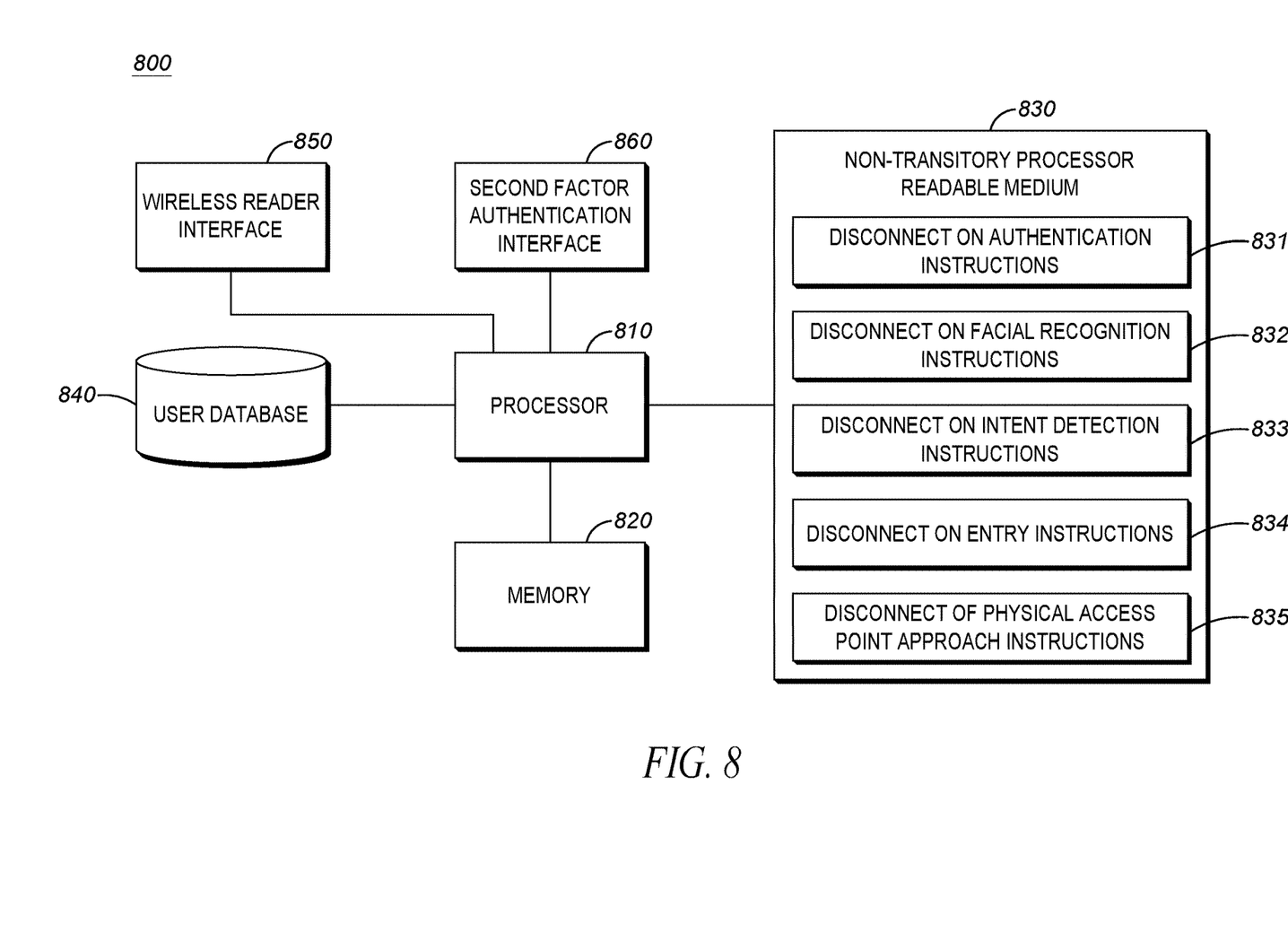
FIG. 8 is an example device that may implement the authentication queuing in access control systems techniques described herein.

The access control system 115 may be any type of computer system that is capable of interacting with a physical access point 110 to control the physical access point to either allow or deny an attempt by a person to traverse the physical access point. The access control system 115 may maintain a database (not shown) of users with an indication of which users are authorized to traverse the physical access point 110. The database may also include data that may be used to identify a user that is provided when a user enrolls with the access control system 115. Examples of such data can be the users name, a mobile device associated with the user, biometric data associated with the user (e.g. facial print, voice print, fingerprint, iris scan, etc.), personal identification numbers, passwords, and any other such data that may be used to identify the user. The database may also include an indication if the user is allowed to access the restricted area protected by the physical access control point 110. As will be described in further detail below, the access control system 115 is configured to support the authentication queuing in access control systems techniques described herein. An example of a device that may implement the authentication queuing in access control systems techniques described herein is depicted in FIG. 8.

Coupled to the physical access point 110 and the access control system 115 is a wireless reader 120. The wireless reader 120 may be used to connect to a mobile device that is in the possession of a user. Examples of wireless readers may include Bluetooth Low Energy (BLE) readers, WiFi readers, or any other type of wireless technology that may be used to establish a wireless connection with a mobile device in order to authenticate the mobile device. For the remainder of this description, the wireless reader may also be referred to as a BLE reader 120. However, it should be understood that this is for ease of description and not by way of limitation.

The system 100 also includes a second factor authentication system 130. The second factor authentication system 130 can be any type of technology that may be utilized to verify the identity of a user. For example, second factor authentication system 130 may be a biometric authentication system (e.g. facial recognition, voice print recognition, fingerprint recognition, iris recognition, DNA recognition, etc.), a personal identification number (PIN) system, a password system, or any other type of system that may utilize something the user is (e.g. biometric) or something the user knows (e.g. PIN, etc.) to verify the user's identity. The techniques described herein are not dependent on any particular type of second factor authentication system 130, however for ease of description, the second factor authentication system will be described as a facial recognition system 130.

Prior to engaging with the access control system 115 for purposes of entering restricted areas protected by physical access point 110, a user will enroll with the access control system. Enrolling with the system may include things such as registering the user's mobile device. As explained above, the user's mobile device may be a smartphone, a smart watch, a key fob, or any other type of device that is capable of connecting with the wireless reader 120. Registering the mobile device may include providing information, such as a mobile device ID (e.g. Key ID) that may be used when verifying the authenticity of the device. Registering may also include providing a public encryption key of the mobile device that may be utilized as part of a public-private key authentication process. The specific form of registration of the mobile device is unimportant so long as the access control system is able to authenticate a mobile device as having been previously registered.

The enrollment process may also include associating the mobile device with information related to identifying the user. As explained above, the second factor authentication system 130 could be based on biometrics, PINs, passwords, or any other such data that could be associated with a user. Finally, the access control system 115 could associate each user with an indication that the user is allowed/prohibited from traversing a particular physical access point 110. As should be clear, the access control system 115 may be associated with multiple physical access points 110, and access could be defined individually for each physical access point.

In operation, a user 151 who has enrolled with the access control system 115 may move from an area 160 that is outside of the range of wireless reader 120 into an area that is within the range of the wireless reader 120. In the present example, the range is referred to as the BLE coverage zone 170, although as explained above the techniques described herein are not limited to BLE. The user 151 may have in his possession a mobile device (not shown) that is capable of connecting to the wireless reader.

Once inside the BLE coverage zone 170, the user's 151 mobile device may attempt to authenticate with the access control system 115. In one example implementation, the user's 151 mobile device may connect to the wireless reader 120 and receive a challenge message. The mobile device may compute a challenge response and encrypt the challenge response with a private key known only to the mobile device. The mobile device may then send the encrypted challenge response to the wireless reader 120 along with an identifier for the mobile device. In one implementation, the wireless reader 120 may retrieve the public key associated with the mobile device that was stored during the enrollment process from the access control system 115.

The wireless reader may then recover the challenge response by decrypting the encrypted challenge response. As is well known in public-private key encryption, a message encrypted with a private key can only be unencrypted with a paired public key. Thus, if the unencrypted challenge response is the response that was expected by the wireless reader 120, then it can be ensured that the response was encrypted by a mobile device in possession of the associated private key. Although a specific authentication method has been described, it should be understood that techniques described herein are not dependent on any particular authentication mechanism. Any technique that allows the access control system 115 to authenticate the mobile device as one that has been previously registered is suitable for use with the techniques described herein.

After the user's 151 mobile device has been authenticated, the access control system 115 may place the mobile device (e.g. the Key ID of the mobile device) into an authenticated devices queue that is associated with the physical access point 110. The authenticated devices queue may be a list of mobile devices within the BLE coverage zone 170 that have been authenticated by the access control system 115. Once the mobile device has been added to the authenticated devices queue, the mobile device can be sent a reconnection parameter (described below) and then be instructed to disconnect from the wireless reader 120, thus freeing up a connection that may then be used by another user 152 who enters the BLE coverage zone 170.

The user 151 may then proceed to the physical access point 115 and register his presence via the second factor authentication system 130. For example, in the case of a facial recognition system, there may be a camera in the vicinity of the physical access point 110. Upon recognition of the face 180 by the second factor authentication system 130, the access control system 115 may determine if the mobile device associated with the facially recognized user is included in the authenticated devices queue. If so, the access control system 115 may then verify if the user is authorized to traverse the physical access point 110. If so, the physical access point 115 is instructed to allow the user 151 to enter (e.g. unlocks door, opens gate, etc.). If the user 151 is not authorized, then the physical access point remains 110 closed.

What should be understood is that the user's 151 mobile device and the wireless reader 120 are using a wireless connection only for the period of time necessary to authenticate the user's device. Once the user's 151 mobile device is authenticated, the wireless connection to the reader is dropped and that connection may then be used by another user 152. As mentioned above, in some implementations the number of wireless connections provided by the wireless reader can be limited and as such utilizing the connection for as short a time as possible may be beneficial.

As mentioned above, the wireless reader 120 may send a reconnect parameter to the user's 151 mobile device indicating when the user's mobile device should attempt to authenticate. Such a parameter can prevent the user's 151 previous authentication from going stale. One example parameter may be an elapsed time. The user's 151 mobile device may be instructed to disconnect and re-authenticate after a defined time period (e.g. 5 minutes). If the user 151 has not traversed the physical access point within the defined time, the authentication control system 115 may remove the user's 151 mobile device from the authenticated devices queue. Absent the reconnection parameter, when the user 151 attempted to traverse the physical access point 115, the attempt would be denied because the user's 151 mobile device is not included in the authenticated devices queue. Inclusion of the reconnection parameter ensures that the list of devices in the authenticated mobile devices queue does not go stale while at the same time not requiring the user's mobile device to maintain a constant connection with the wireless reader 120.

Although a reconnection parameter related to time has been described, it should be understood that the reconnection parameter is not so limited. The reconnection parameter could be a Received Signal Strength Indicator (RSSI) (e.g. re-authenticate if the received signal strength from the wireless reader drops below a threshold), a distance from the wireless reader (e.g. using location technologies such as GPS or Ultra Wide Band (UWB), the mobile device could be instructed to re-authenticate if it travels further than a threshold distance from the wireless card reader), or any other reconnection parameter. What should be understood is that the access control system 115 will not keep the user's 151 mobile device in the authenticated devices queue forever. At some point the device will be removed from the queue and the device will no longer be considered authenticated.

Figure 2:
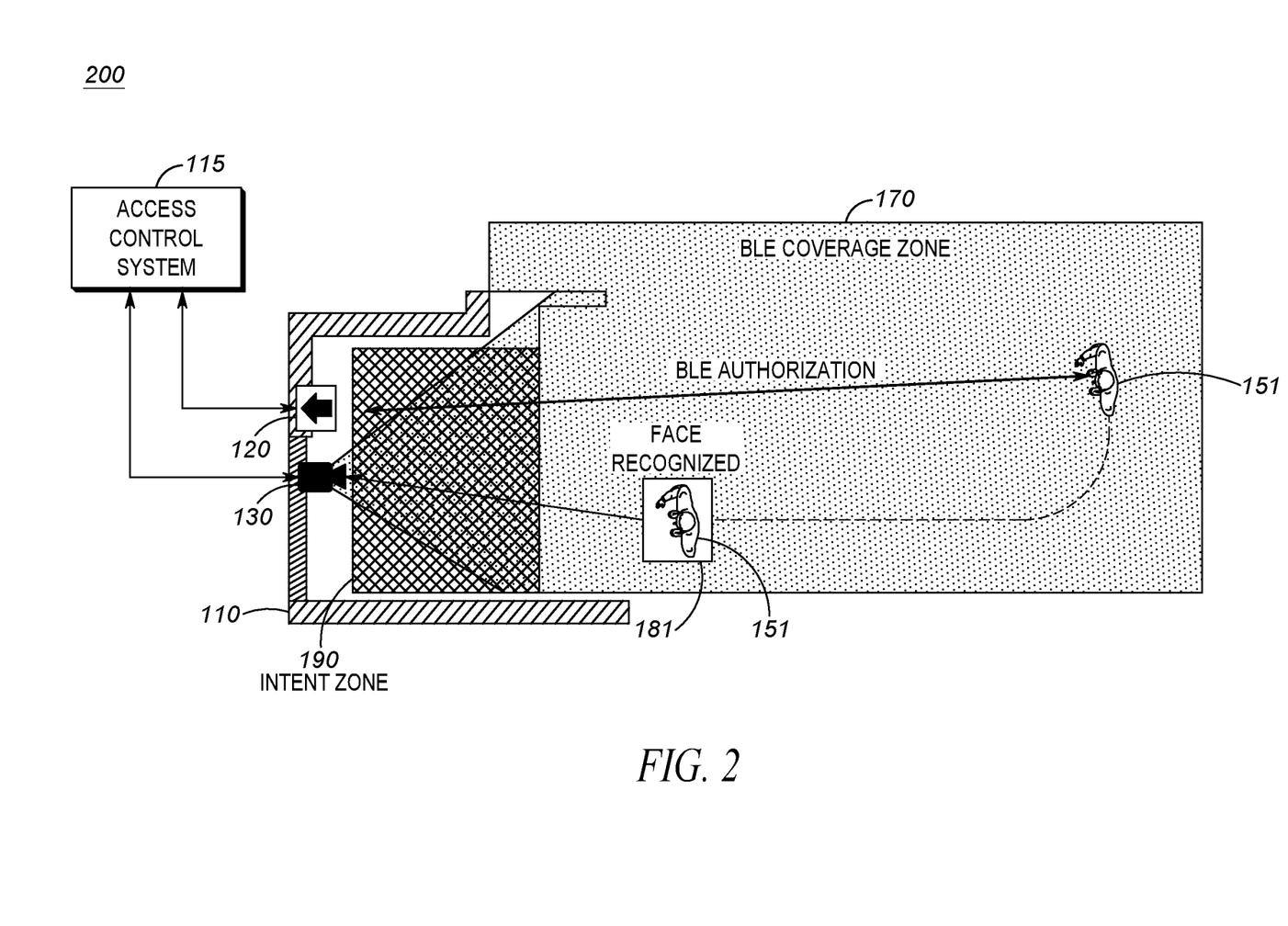
FIG. 2 is an example of an access control system utilizing a possession of an authorized mobile device in combination with a facial recognition system to grant access to a physical access point.

FIG. 2 is an example of an access control system utilizing a possession of an authorized mobile device in combination with a facial recognition system to grant access to a physical access point. System 200 is very similar to system 100 and contains similar components. For purposes of ease of description, components that perform the same function in system 200 are labeled with the same reference numeral used in system 100. Just as in FIG. 1, a user 151 may enter the BLE coverage zone 170 and connect via the wireless reader 120. The user may then authenticate with the access control system 115. However, in system 200, the user's 151 mobile device remains connected to the wireless reader 120 and the user's mobile device is not yet placed in the authenticated devices queue.

At some point, the user 151 may move close enough to the physical access point 110 that the second factor authentication system 130 may be able to identify the user. For example, in a facial recognition system, the second factor identification system 130 may be able to recognize 181 the face of user 151 prior to the user entering the intent region 190. The intent region 190 is an area in the vicinity of the physical access point 110 where the access control system can determine that the user 151 is either currently attempting to traverse the physical access point or where it can be determined with reasonable certainty that user will attempt to traverse the physical access point 110. The intent region 190 will be described in further detail below.

At the point 181 where the user's 151 face is detected, the access control system 115 can confirm if it is currently connected to the user's mobile device via the wireless reader 120 and if the wireless device has been authenticated. If so, at that point, the user's 151 wireless device can be added to the authenticated devices queue associated with the physical access point 110 and the mobile device can be instructed to disconnect (after being given a reconnection parameter) from the wireless reader 120, thus freeing up a connection for other users to use.

By maintaining the connection until the face is actually detected, the access control system can be ensured that both the face and the wireless device of the user 151 were present at the same time. This aspect may be helpful in resolving a situation where a bad actor waits near the physical access point 110 until an authorized user walks by (e.g. user who does not intend to traverse the physical access point) and his mobile device is entered into the authenticated devices queue, then the bad actor spoofs the second factor identification system 130 (e.g. uses a mask to fool an unsophisticated facial recognition system). The second factor identification system 130 may then continue to track the user 151 until he traverses the physical access point.

Although the implementation described in system 200 does offer some protection against the described attack, it does come at the cost that the wireless connection to the user's mobile device must be maintained until the second factor identification system 130 is able to begin tracking the user 151. In addition, it should be understood that if for some reason the tracking fails (e.g. the facial recognition camera is temporarily blocked by a passing user) the user's 151 mobile device will be removed from the authenticated devices queue, because the access control system would no longer be able to verify that the user 151 is still in possession of the mobile device.

Just as above, when the user 151 actually arrives at the physical access point 110 and registers his presence via the second factor authentication system 130 (e.g. is in the intent region 190), the access control system may determine if the user's mobile device is in the authenticated devices queue and if the user is authorized to traverse the physical access point 110. If so, the access control system 115 instructs the physical access point 110 to allow the user 151 to traverse the physical access point.

Figure 3:
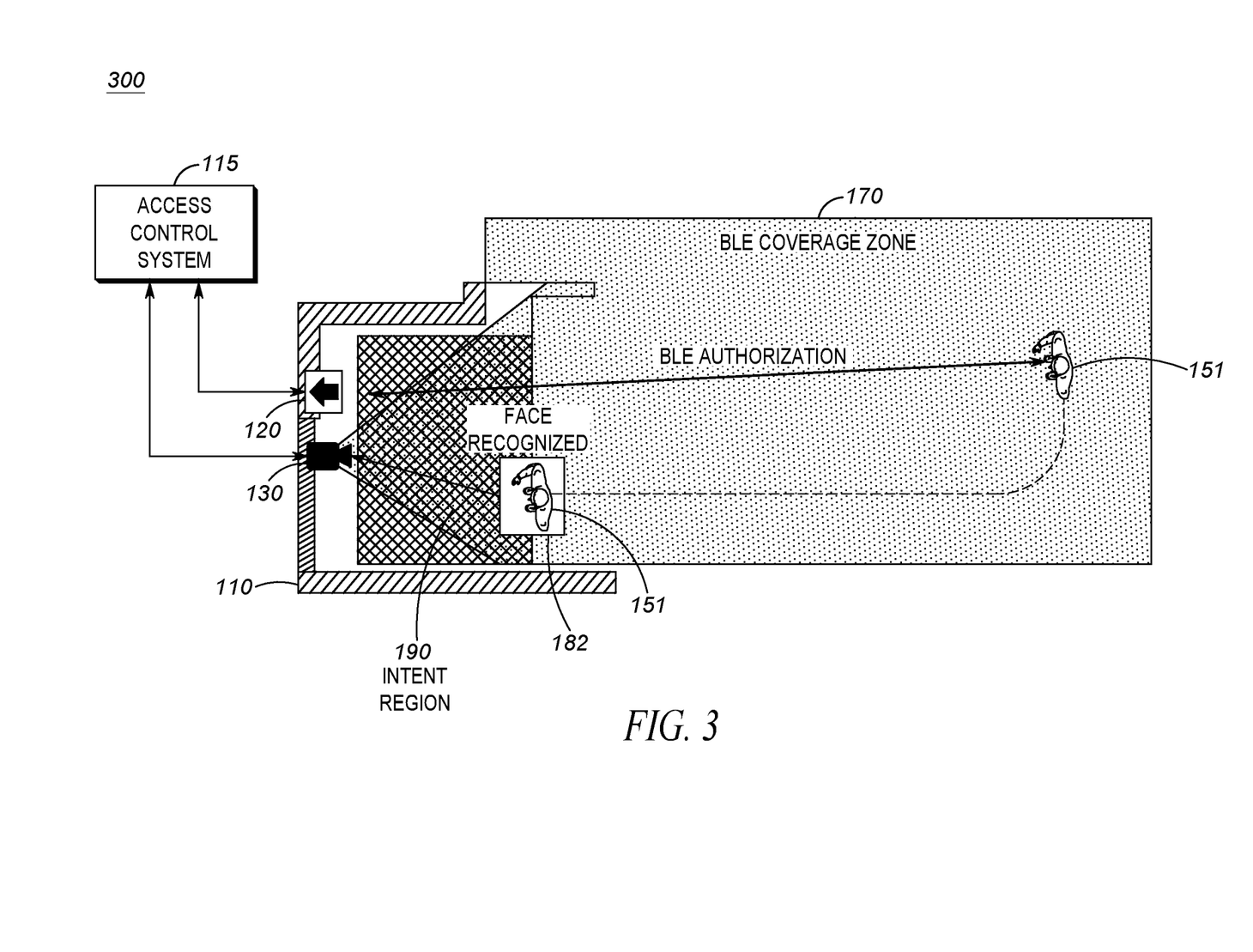
FIG. 3 is an example of an access control system utilizing a possession of an authorized mobile device in combination with an intent detection system to grant access to a physical access point.

FIG. 3 is an example of an access control system utilizing a possession of an authorized mobile device in combination with an intent detection system to grant access to a physical access point. System 300 depicted in FIG. 3 is very similar to system 100 and 200 and contains similar components. For purposes of ease of description, components that perform the same function in system 300 are labeled with the same reference numeral used in system 100 and 200. Just as in system 200, a user 151 enters the BLE coverage zone 170 and connects to the wireless reader 120 to authenticate the user's 151 mobile device. The user's 151 mobile device remains connected to the wireless reader 120.

At some point, the user 151 may move into what is referred to as an intent region 190. The intent region 190 may be a region that is determined by the access control system 115 to indicate that the user 151 actually intends to traverse the physical access point 110. In other words, it means that the access control system 115 can determine, with sufficient confidence, that the user 151 is not only present near the physical access point 110, but actually intends to traverse the physical access point (as opposed to just pass by it, loiter near it, etc.).

The techniques described herein are not limited to any particular mechanism for determining intent. In the simplest case, the intent to traverse the physical access point 110 may be determined when the user 151 registers his presence via the second factor authentication system 130. For example, in the case of a facial recognition system, the access control system 115 may establish the user's 151 intent to traverse the physical access point 110 when the user is directly in front of the camera associated with the physical access point 110.

The intent may also be inferred based on the trajectory of the user 151. For example, the user's 151 position can be tracked using any number of available tracking technologies (e.g. tracking a bounding box around a recognized face, tracking the mobile device via GPS or Ultra Wideband (UWB) technology, tracking RSSI values). If the user's trajectory indicates that his path will lead him to the location where his presence will lead him to the location where he would register with the second factor authentication system 130 (e.g. the camera in a facial recognition system, etc.) the access control system may the declare that the user 151 intends to traverse the physical access point 110.

In the example of system 300, assume that the second factor authentication system 130 is a facial recognition system. When the users face is detected 182 and the access control system 115 determines, with sufficient confidence, that the user 151 intends to traverse the physical access point 110, it is at that point that the access control system 115 adds the user's 151 mobile device to the authenticated devices queue. The user's 151 mobile device may then be instructed to disconnect (with reconnection parameter) from the wireless reader. Just as above, when the user actually registers his presence with the second factor authentication system 130 the access control system may determine if the user's 151 mobile device is in the authenticated devices queue and if so if the user 151 is authorized to traverse physical access point 110. If so, the user is allowed to traverse the physical access point.

The connection between the user's 151 mobile device and the wireless reader 120 is maintained for a longer period of time than it is in the case of system 100 and 200. However, because the user's 151 mobile device remains connected right up until the point the intent of the user to traverse the physical access point is determined, it can be ensured that the user 151 is actually planning on traversing the physical access point and that the user 151 is in physical possession of his mobile device at the point where that intent determination is made.

Figure 4:
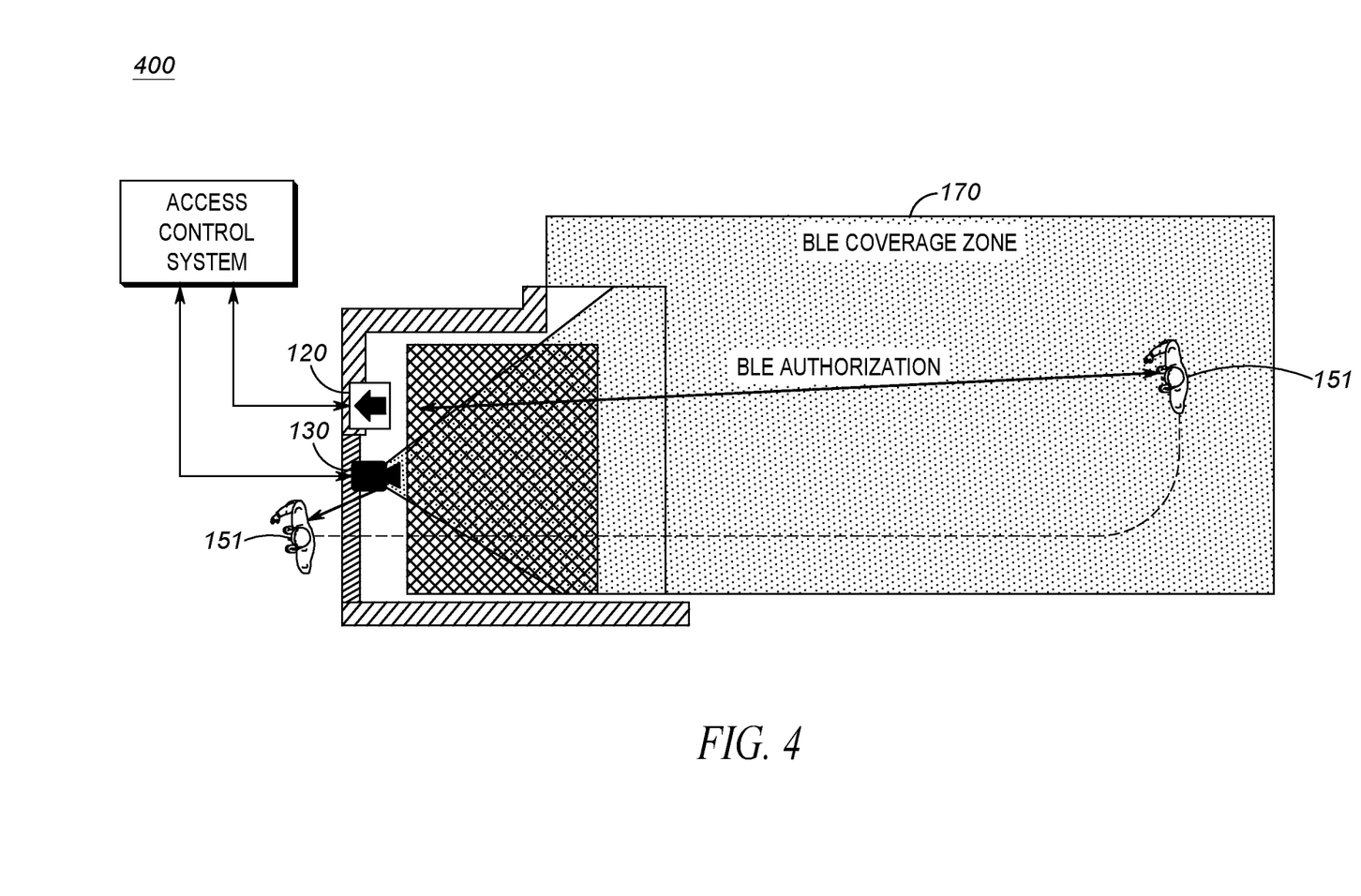
FIG. 4 is an example of an access control system utilizing a possession of an authorized mobile device in combination with actual access via the physical access point.

FIG. 4 is an example of an access control system utilizing a possession of an authorized mobile device in combination with actual access via the physical access point. System 400 depicted in FIG. 4 is very similar to system 100, 200, and 300 and contains similar components. For purposes of ease of description, components that perform the same function in system 300 are labeled with the same reference numeral used in system 100, 200, and 300. Just as in system 200, a user 151 enters the BLE coverage zone 170 and connects to the wireless reader 120 to authenticate the user's 151 mobile device. The user's 151 mobile device remains connected to the wireless reader 120.

Although not shown, the user 151 may then approach the physical access point 110 and register his presence via the second factor authentication system 130. It should be noted that the user's 151 mobile device is still connected to the wireless reader at this point. The access control system 115 may determine if the user's 151 mobile device is currently connected to the wireless reader 120 and has been authenticated. If so, the access control system 115 may determine if the user is authorized to traverse the physical access point 110. If the answer to both of these determinations is yes, then the access control system 115 instructs the physical access point 110 to allow the user to enter the restricted area. It is only after the user has actually entered the restricted area that the user's 151 mobile device is instructed to disconnect (again with reconnect parameter) from the wireless reader 120.

The connection between the user's 151 mobile device and the wireless reader 120 is maintained for a longer period of time than it is in the case of system 100, 200, and 300. However, because the user's 151 mobile device remains connected until after the user has entered the restricted area, there is no doubt that the user actually intended to enter the restricted area. By dropping the connection once inside the restricted area, no connections are wasted on users that have already entered the restricted area.

Figure 5:
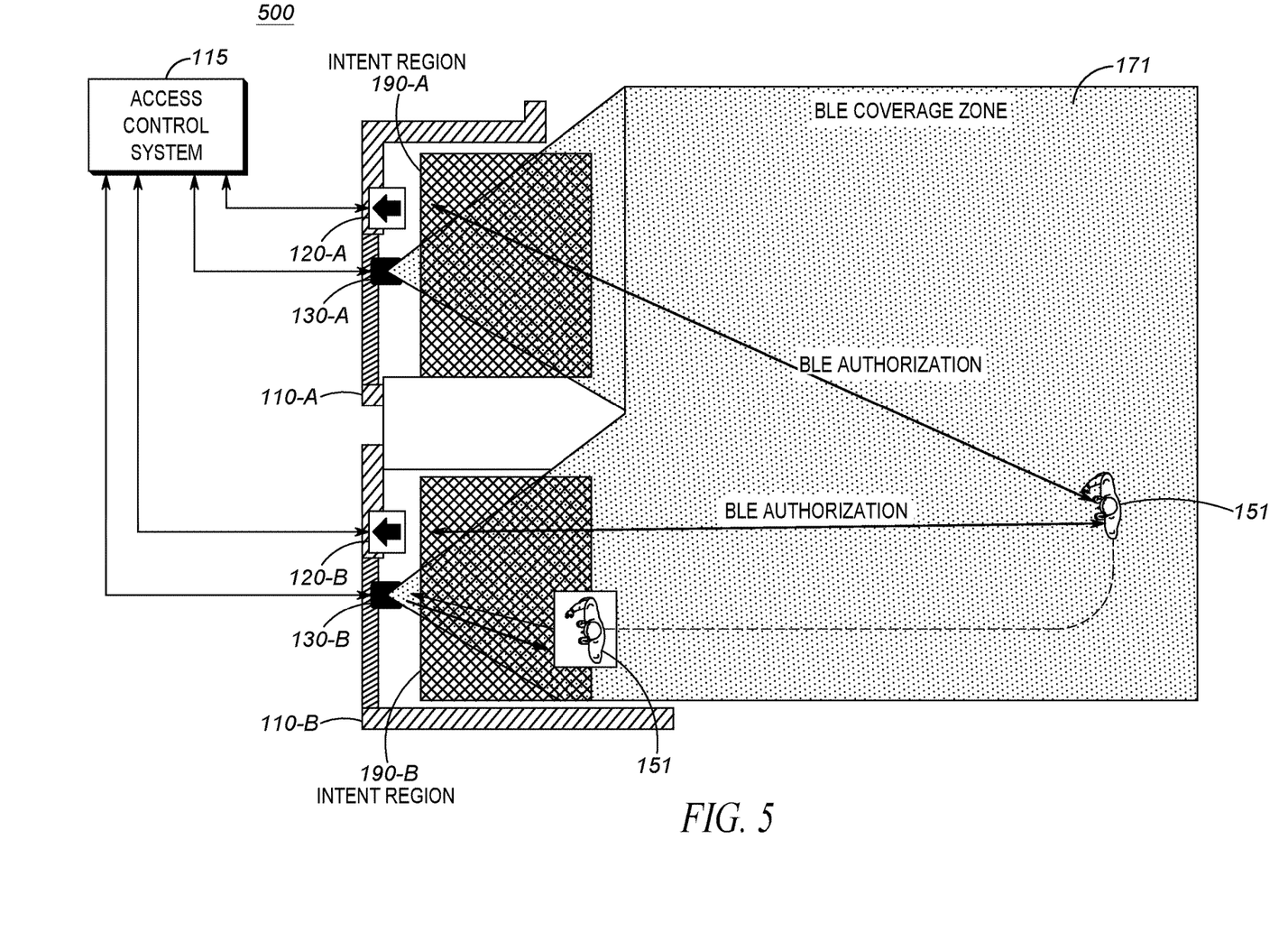
FIG. 5 is an example of an access control system utilizing a possession of an authorized mobile device in combination with an intent detection system to limit access to one physical access point from a plurality of physical access points.

FIG. 5 is an example of an access control system utilizing a possession of an authorized mobile device in combination with an intent detection system to limit access to one physical access point from a plurality of physical access points. System 500 is essentially the physical access points of system 300 duplicated. For example, there may be two physical access points 110-A,B, each with their own wireless readers 120-A,B, second factor authentication systems 130-A,B. Each of the physical access points 110-A, B may be connected to the same access control system 115. Such a configuration may occur, for example, in an office building which has a hallway with doors that are adjacent to each other. Although only two physical access points 110 are shown, the described techniques are applicable to any number of physical access points.

What should be noted is that BLE coverage zone 171 may be the overlap of the individual BLE coverage zones provided by each of wireless readers 120-A,B. In other words, when user 151 initially enters BLE coverage zone 171, the user's 151 mobile device may connect to both wireless readers 120-A,B. As should be understood, this means that the user is consuming two wireless connections, one from each wireless reader 120-A,B.

At some point, the access control system 115 may determine the user 151 intends to traverse one of the physical access points 110. As shown, the user is in the intent region 190-B of physical access point 110-B. The process of determining intent was described in further detail above with respect to FIG. 3. What should be understood is that the access control system 115 has determined that the user 151 intends to traverse physical access point 110-B.

At this point, the user's 151 mobile device may be sent an instruction to disconnect from wireless reader 120-A (with reconnection parameter) because the access control system has determined that the user 151 intends to traverse physical access point 110-B. It should be noted that is some implementations, the instruction to disconnect from wireless reader 110-A may come from the access control system. In other implementations, once the intent to enter physical access point 110-B is determined, the wireless reader 120-B may be informed of the intent. The wireless reader 120-B may then inform wireless reader 120-A that the connection to the user's 151 mobile device should be dropped. The particular implementation is unimportant. What should be understood is that once a determination is made that the user intends to traverse a particular physical access point, connections to the wireless readers of all other access points is discontinued.

One the remaining connections are dropped, the process proceeds just as it did with respect to FIG. 3. The user's 151 mobile device may be added to the authenticated devices queue and the process proceeds just as described in FIG. 3.

In an alternate implementation, once the user's 151 mobile device enters the BLE coverage zone 171 and connects and authenticates with both wireless readers 120-A,B, after authentication, the mobile device may be placed in authenticated device queues that are associated with each physical access point respectively, and then the connection is dropped. For example, the process described with respect to FIG. 1 could be repeated for each physical access point 110-A,B. Once the intent to enter one of the physical access points is determined with a sufficient confidence level, the access control system 115 may then cause the mobile device to be removed from all authenticated devices queues associated with all other remaining physical access points.

Figure 6:
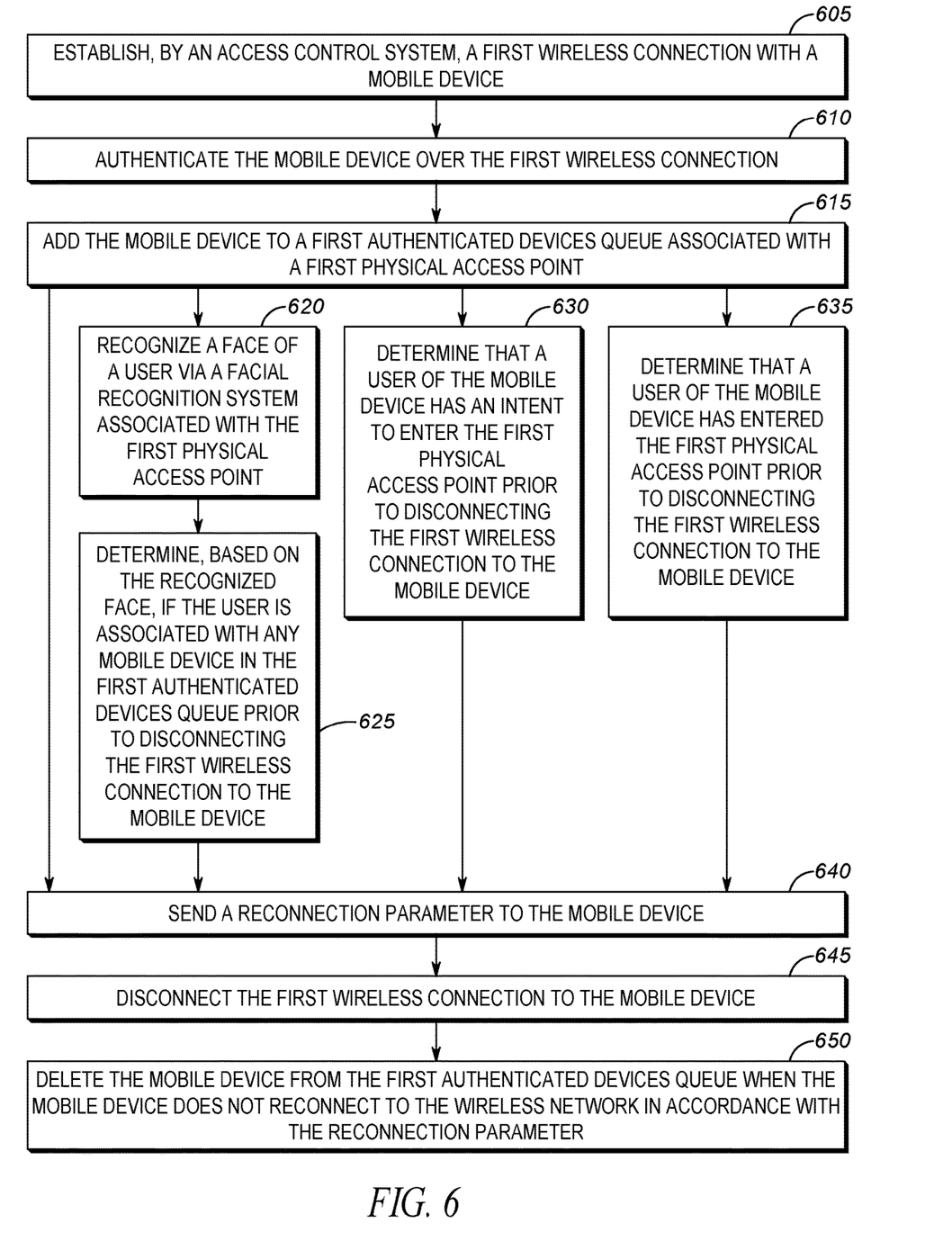
FIG. 6 is an example of a flow diagram of the authentication queuing in access control systems techniques described herein.

FIG. 6 is an example of a flow diagram of the authentication queuing in access control systems techniques described herein. In block 605, an access control system may establish a first wireless connection with a mobile device. As explained above, the wireless connection may be a BLE wireless connection, however the techniques described herein are not limited to any particular wireless connection technology. In block 610, the mobile device may be authenticated over the first wireless connection. In other words, the identity of the mobile can be confirmed as a mobile device having previously been enrolled in the access control system. The particular form of authentication may include a challenge-response sequence utilizing public-private key pairs to confirm that a mobile device is authentic. However, this is merely one example mechanism for authentication, and any other mechanism for determining that a mobile device has enrolled in the access control system would be suitable.

In block 615, the mobile device may be added to a first authenticated devices queue associated with the first physical access point. In other words, the first authenticated devices queue is a list of all mobile devices that have successfully completed the authentication process at the first physical access point. As will be described in further detail below, such devices in the queue may be deemed as authentic at the first physical access point, even in those devices do not currently have a connection the wireless reader at the first physical access point.

In some implementations, such as the implementation described in FIG. 1, the process moves directly to block 640, which is described in further detail below. In an implementation, such as the one described in FIG. 2, the process moves to block 620. In block 620, a face of a user may be recognized via a facial recognition system associated with the first physical access point. In other words, a camera whose field of view includes the area around the first physical access point may detect the user's face. The process then moves to block 625, where it is determined, based on the recognized face, if the user is associated with any mobile device in the first authenticated devices queue prior to disconnecting the first wireless connection to the mobile device. In other words, the access control system recognizes a face within the vicinity of the first physical access point and determines the mobile device associated with the user (e.g. from the information provided at enrollment). The access control system then determines if the identified mobile device is included in the authenticated devices queue. If so, the process moves to block 640, which is described below.

In another implementation, such as the one described with respect to FIG. 3, the process moves to block 630. In block 630, it may be determined that a user of the mobile device has an intent to enter the first physical access point prior to disconnecting the first wireless connection to the mobile device. In other words, based on various known techniques, it is determined if the user is actually intending to traverse the physical access point, in contrast to just walking by the physical access point. If so, the process moves to block 640, which is described in further detail below.

In another implementation, such as the one described with respect to FIG. 4, the process moves to block 635. In block 635, it may be determined that a user of the mobile device has entered the first physical access point prior to disconnecting the first wireless connection to the mobile device. In other words, it may be determined that the user has already entered the restricted area, and thus it is no longer necessary to worry about authenticating the user, because he has already been authenticated. The process may then move to block 640.

In block 640, a reconnection parameter may be sent to the mobile device. As explained above, it would be undesirable to keep the mobile device in the authenticated devices queue forever, so the access control system may purge the mobile device from the queue. The reconnection parameter may be used to inform the mobile device under what conditions it should reconnect to the wireless reader of the physical access point and attempt to re-authenticate. In block 645, the first wireless connection to the mobile device may be disconnected. Disconnecting the wireless connection allows for the connection to be reused by another mobile device. This is useful to preserve wireless connection resources, especially in cases where the wireless leader has a limited number of wireless connections.

Once the mobile device is included in the authenticated devices queue, if a user appears at the physical access point to provide secondary authentication (e.g. biometric, PIN, etc.) it can be determined if the mobile device associated with the user has already been authenticated, without having to maintain a connection to the user's mobile device. However, if after some period of time, the user has not actually entered the restricted area, the process may move to block 650. In block 650, the mobile device may be deleted from the first authenticated devices queue when the mobile device does not reconnect to the wireless network in accordance with the reconnection parameter. Such a case would indicate that the user has not already entered the restricted area and, in fact, is actually no longer in the vicinity of the first physical access point. As such, the mobile device is removed from the authenticated devices queue to prevent the queue from being filled with stale entries.

Figure 7:
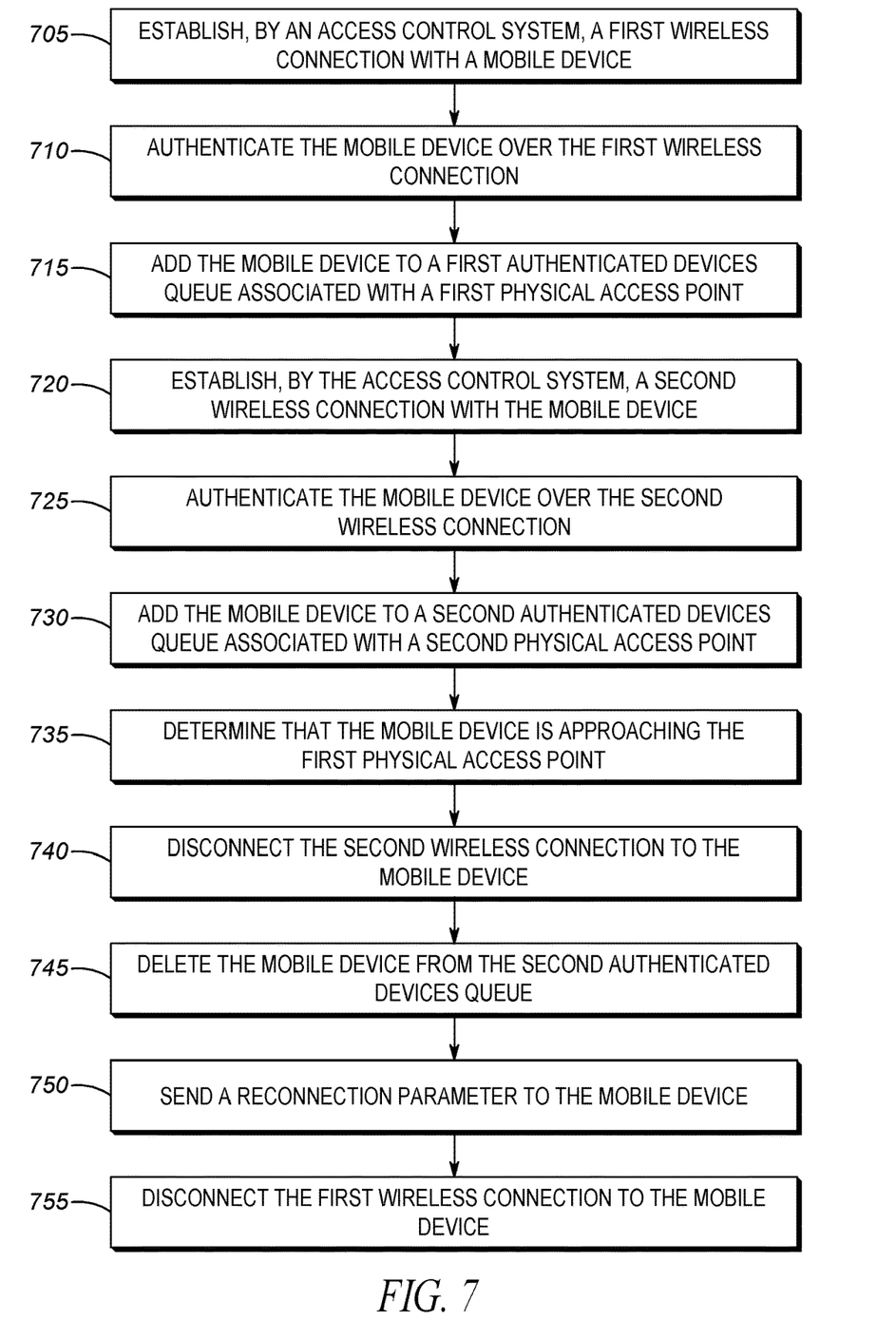
FIG. 7 is another example of a flow diagram of the authentication queuing in access control systems techniques described herein.

FIG. 7 is another example of a flow diagram of the authentication queuing in access control systems techniques described herein. The example flow diagram generally corresponds to the implementation described with respect to FIG. 5. Blocks 705-715 correspond with blocks 605-615 of FIG. 6, and for simplicity of explanation, the description will not be repeated here.

In block 720, the access control system may establish a second wireless connection with the mobile device. In other words, the same action performed in block 605 are repeated, with the difference being that the connection is established with a second physical access point. In block 725, the mobile device may be authenticated over the second wireless connection. In other words, the same authentication process described with respect to block 610 may occur, with the difference being that the authentication is with the second physical access point. In block 730, the mobile device may be added to a second authenticated devices queue associated with a second physical access point. In other words, the same adding to the authentication queue process described in block 615 is repeated with the difference being the authenticated devices queue is associated with the second physical access point.

In block 735, it may be determined that the mobile device is approaching the first physical access point. This determination may be made based on an intent determination, as described above. In some implementations, the determination may be made by the mobile device leaving the field of view of all physical access points, except for one. The techniques described herein are not dependent of the specific mechanism used to determine that the mobile device is approaching one of the physical access points.

In block 740, the second wireless connection may be disconnected. Because the user is not intending to traverse the second physical access point, there is no need to use a wireless connection to the second physical access point. In block 745, the mobile device may be deleted from the second authenticated devices queue. As just mentioned, if it is determined that the user is not going to traverse the second physical access point, there is no need for the mobile device of the user to be included in the authenticated devices queue of the second physical access point.

Blocks 750 and 755 are identical to blocks 640 and 645 respectively and for the sake of simplicity the description is not repeated here.

FIG. 8 is an example device that may implement the authentication queuing in access control systems techniques described herein. It should be understood that FIG. 8 represents one example implementation of a computing device that utilizes the techniques described herein. Although only a single processor is shown, it would be readily understood that a person of skill in the art would recognize that distributed implementations are also possible. For example, the various pieces of functionality described above (e.g. wireless reader, second factor authentication, user database etc.) could be implemented on multiple devices that are communicatively coupled. FIG. 8 is not intended to imply that all the functionality described above must be implemented on a single device.

Device 800 may include processor 810, memory 820, non-transitory processor readable medium 830, user database 840, wireless reader interface 850, and second factor authentication interface 860.

Processor 810 may be coupled to memory 820. Memory 820 may store a set of instructions that when executed by processor 810 cause processor 810 to implement the techniques described herein. Processor 810 may cause memory 820 to load a set of processor executable instructions from non-transitory processor readable medium 830. Non-transitory processor readable medium 830 may contain a set of instructions thereon that when executed by processor 810 cause the processor to implement the various techniques described herein.

For example, medium 830 may include disconnect on authentication instructions 831. The disconnect on authentication instructions may cause the processor to authenticate a mobile device in the vicinity of a physical access point by comparing data received over wireless reader interface 850 from the wireless reader at the physical access point to data stored in a user database 840 at the time the user enrolled in the access control system. If authenticated, the processor may cause the mobile device to disconnect from the wireless reader. When the user provides second factor authentication at the wireless access point, the information may be provided to the processor via the second factor authentication interface. Access to the user may then be granted or denied. The disconnect on authentication instructions 831 are described throughout the specification including places such as FIG. 1 and FIG. 6, blocks 605-615 and 640-650.

Medium 830 may include disconnect on facial recognition instructions 832. The disconnect on facial recognition instructions may cause the processor to authenticate a mobile device in the vicinity of a physical access point by comparing data received over wireless reader interface 850 from the wireless reader at the physical access point to data stored in a user database 840 at the time the user enrolled in the access control system. If authenticated, the processor may cause the mobile device to disconnect from the wireless reader once the users face is recognized. When the user provides second factor authentication at the wireless access point, the information may be provided to the processor via the second factor authentication interface. Access to the user may then be granted or denied. The disconnect on facial recognition instructions 832 are described throughout the specification including places such as FIG. 2 and FIG. 6, blocks 605-625 and 640-650.

Medium 830 may include disconnect on intent detection instructions 833. The disconnect on intent instructions may cause the processor to authenticate a mobile device in the vicinity of a physical access point by comparing data received over wireless reader interface 850 from the wireless reader at the physical access point to data stored in a user database 840 at the time the user enrolled in the access control system. If authenticated, the processor may cause the mobile device to disconnect from the wireless reader once an intent to traverse the physical access point is detected. When the user provides second factor authentication at the wireless access point, the information may be provided to the processor via the second factor authentication interface. Access to the user may then be granted or denied. The disconnect on intent detection instructions 833 are described throughout the specification including places such as FIG. 3 and FIG. 6, blocks 605-615, 630, and 640-650.

Medium 830 may include disconnect on entry instructions 834. The disconnect on entry instructions may cause the processor to authenticate a mobile device in the vicinity of a physical access point by comparing data received over wireless reader interface 850 from the wireless reader at the physical access point to data stored in a user database 840 at the time the user enrolled in the access control system. If authenticated, the processor may cause the mobile device to disconnect from the wireless reader once the physical access point is traversed. The disconnect on entry instructions 834 are described throughout the specification including places such as FIG. 4 and FIG. 6, blocks 605-615, and 635-650.

Medium 830 may include disconnect on physical access point approach instructions 835. The disconnect on physical access point approach instructions may cause the processor to authenticate a mobile device in the vicinity of multiple physical access points by comparing data received over wireless reader interface 850 from the wireless reader at the physical access points to data stored in a user database 840 at the time the user enrolled in the access control system. Once it is determined which physical access point the user intends to enter, the authentication data may be deleted from all other physical access points. The disconnect on physical access point approach 835 are described throughout the specification including places such as FIG. 5 and FIG. 7.

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot [include a particular function/feature from current spec], among other features and functions set forth herein).

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
   establishing, by an access control system, a first wireless connection with a mobile device;
   authenticating the mobile device over the first wireless connection;
   adding the mobile device to a first authenticated devices queue associated with a first physical access point;
   sending a reconnection parameter to the mobile device, the reconnection parameter informing the mobile device under what conditions it should reconnect and attempt to re-authenticate, wherein the mobile device is removed from the first authenticated devices queue associated with the first physical access point when the mobile device does not re-authenticate in accordance with the reconnection parameter;
   disconnecting the first wireless connection to the mobile device;
   identifying a user approaching the first physical access point, by using a second factor authentication system;
   determining a mobile device associated with the user;
   determining if the mobile device associated with the user is included in the first authenticated devices queue; and
   granting the user access to the first physical access point when the mobile device associated with the user is included in the first authenticated devices queue.

2. The method of claim 1 further comprising:
   establishing, by the access control system, a second wireless connection with the mobile device;
   authenticating the mobile device over the second wireless connection;
   adding the mobile device to a second authenticated devices queue associated with a second physical access point;
   determining that the mobile device is approaching the first physical access point;
   disconnecting the second wireless connection to the mobile device; and
   deleting the mobile device from the second authenticated devices queue.

3. The method of claim 1, wherein the second factor authentication system is a facial recognition system.

4. The method of claim 1 further comprising:
   determining that the user associated with the mobile device has an intent to enter the first physical access point prior to disconnecting the first wireless connection to the mobile device.

5. The method of claim 1 further comprising:
   determining that the user associated with mobile device has entered the first physical access point prior to disconnecting the first wireless connection to the mobile device.

6. The method of claim 1 further comprising:
   deleting the mobile device from the first authenticated devices queue when the mobile device does not reconnect the wireless connection in accordance with the reconnection parameter.

7. The method of claim 1 wherein the first wireless connection is a Bluetooth Low Energy (BLE) wireless connection.

8. The method of claim 1 wherein the reconnection parameter comprises:
   a time.

9. The method of claim 1 wherein the mobile device is a smartphone.

10. A system comprising:
    a processor; and
    a memory coupled to the processor, the memory containing a set of instructions thereon that when executed by the processor cause the processor to:
       establish, by an access control system, a first wireless connection with a mobile device;
       authenticate the mobile device over the first wireless connection;
       add the mobile device to a first authenticated devices queue associated with a first physical access point;
       send a reconnection parameter to the mobile device, the reconnection parameter informing the mobile device under what conditions it should reconnect and attempt to re-authenticate, wherein the mobile device is removed from the first authenticated devices queue associated with the first physical access point when the mobile device does not re-authenticate in accordance with the reconnection parameter;
       disconnect the first wireless connection to the mobile device;
       identifying a user approaching the first physical access point, by using a second factor authentication system;
       determining a mobile device associated with the user;
       determining if the mobile device associated with the user is included in the first authenticated devices queue; and
       granting the user access to the first physical access point when the mobile device associated with the user is included in the first authenticated devices queue.

11. The system of claim 10 further comprising instructions to:
    establish, by the access control system, a second wireless connection with the mobile device;
    authenticate the mobile device over the second wireless connection;
    add the mobile device to a second authenticated devices queue associated with a second physical access point;
    determine that the mobile device is approaching the first physical access point;
    disconnect the second wireless connection to the mobile device; and
    delete the mobile device from the second authenticated devices queue.

12. The system of claim 10, wherein the second factor authentication system is a facial recognition system.

13. The system of claim 10 further comprising instructions to:
    determine that the user associated with the mobile device has an intent to enter the first physical access point prior to disconnecting the first wireless connection to the mobile device.

14. The system of claim 10 further comprising instructions to:
determine that the user associated with the mobile device has entered the first physical access point prior to disconnecting the first wireless connection to the mobile device.

15. The system of claim 10 further comprising instructions to:
delete the mobile device from the first authenticated devices queue when the mobile device does not reconnect the wireless connection in accordance with the reconnection parameter.

16. A non-transitory processor readable medium containing a set of instructions thereon that when executed by a processor cause the processor to:
establish, by an access control system, a first wireless connection with a mobile device;
authenticate the mobile device over the first wireless connection;
add the mobile device to a first authenticated devices queue associated with a first physical access point;
send a reconnection parameter to the mobile device, the reconnection parameter informing the mobile device under what conditions it should reconnect and attempt to re-authenticate, wherein the mobile device is removed from the first authenticated devices queue associated with the first physical access point when the mobile device does not re-authenticate in accordance with the reconnection parameter;
disconnect the first wireless connection to the mobile device;
identifying a user approaching the first physical access point, by using a second factor authentication system;
determining a mobile device associated with the user;
determining if the mobile device associated with the user is included in the first authenticated devices queue; and
granting the user access to the first physical access point when the mobile device associated with the user is included in the first authenticated devices queue.

17. The medium of claim 16 further comprising instructions to:
establish, by the access control system, a second wireless connection with the mobile device;
authenticate the mobile device over the second wireless connection;
add the mobile device to a second authenticated devices queue associated with a second physical access point;
determine that the mobile device is approaching the first physical access point;
disconnect the second wireless connection to the mobile device; and
delete the mobile device from the second authenticated devices queue.

18. The medium of claim 16, wherein the second factor authentication system is a facial recognition system.

19. The medium of claim 16 further comprising instructions to:
determine that the user associated with the mobile device has an intent to enter the first physical access point prior to disconnecting the first wireless connection to the mobile device.

20. The medium of claim 16 further comprising instructions to:
determine that the user associated with the mobile device has entered the first physical access point prior to disconnecting the first wireless connection to the mobile device.

* * * * *